INVENTORS
Johan Olof Helge Fredholm
Per Harry Elias Claesson
By (signature)
their Atty.

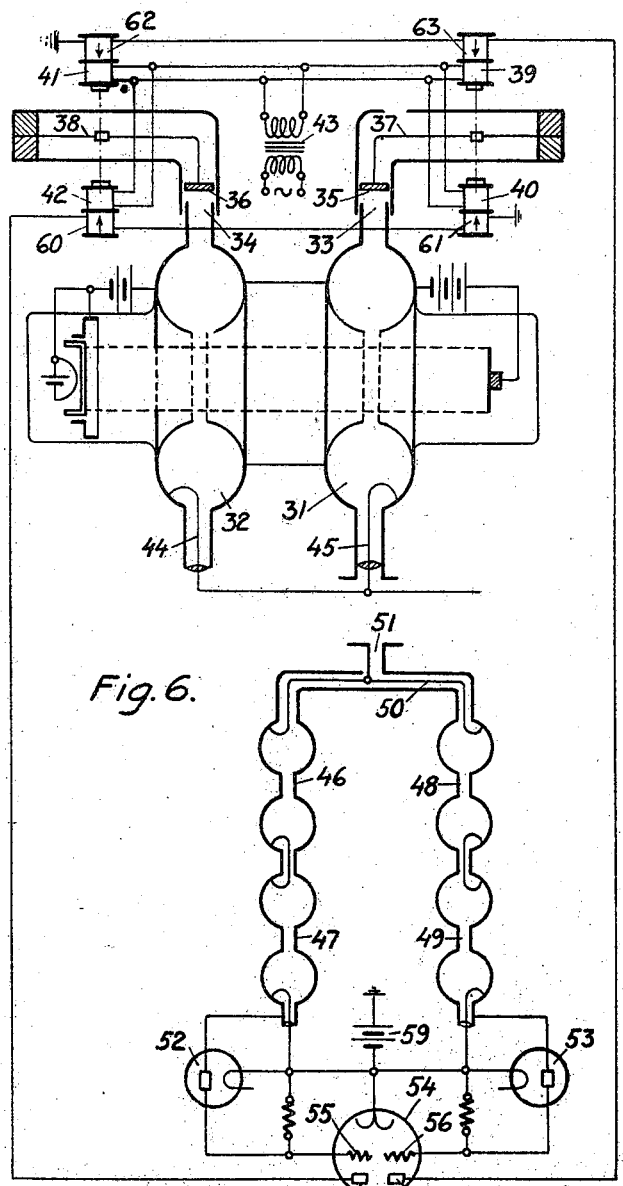

Patented Feb. 24, 1948

2,436,640

UNITED STATES PATENT OFFICE 2,436,640

DEVICE FOR THE FREQUENCY MODULATION OF THE RESONANT FREQUENCY OF CAVITY RESONATORS

Johan Olof Helge Fredholm, Alsten, and Per Harry Elias Claesson, Jakobsberg, Sweden, assignors to Nils Georg Schonander, Stockholm, Sweden Application November 24, 1943, Serial No. 511,522
In Sweden May 7, 1942

2 Claims. (Cl. 250—17)

The present invention refers to a device for periodic changes of the frequency or for frequency modulation of the resonant frequency of cavity resonators, for example in connection with electron tubes comprising one or a plurality of cavity resonators.

The invention consists in a device for the frequency modulation of the resonant frequency of cavity resonators comprising metallic walls for electromagnetic waves and comprising a number of cavity resonators, in which the cavity resonator or a compartment adjacent said cavity resonator, or an inductance and/or a capacity is constructed, arranged and operated periodically to increase and decrease its normal volume, inductance and/or capacity at resonant frequency in step with the desired frequency modulation.

This increase and decrease of the volume of a cavity can be caused in various ways, for example by mechanical devices or electrically by ionizing a gas within the cavity, by means of which the active volume disposable for oscillations within the cavity can be increased and decreased in any desired manner.

The invention is particularly suitable for the frequency modulation of ultrashort radio wave transmitters for television, telephony and other purposes, when it is important in a simple way to frequency modulate the transmitted wave.

According to the present invention it is possible in a single step to cause a greater change of frequency than what has been possible by means of known devices.

According to an embodiment of the present invention it is possible simultaneously with the frequency modulation in a simple way to stabilize the resonant frequency of the resonator.

Heretofore separate frequency stabilizing means have been used, for example a special oscillator controlled by a quartz crystal in order to keep the mean value of the carrier frequency absolutely constant. Another method uses a particularly complicated method of synchronizing by means of a separately tuned oscillator.

The present invention and its operating is further described in connection with the accompanying drawings, of which:

Fig. 6 diagrammatically shows a Klystron provided with a device for the frequency modulation of the basic frequency of the Klystron and for the stabilizing of the said basic frequency.

Figures 1, 2:
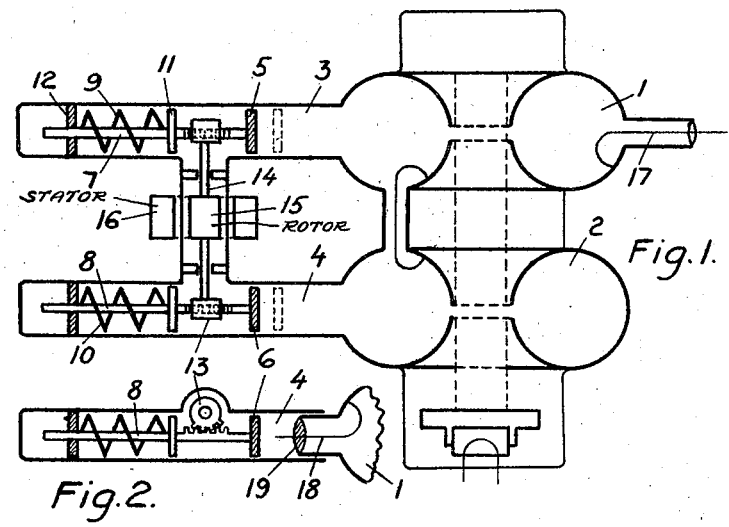
Fig. 1 shows a diagrammatical view of an oscillator of Klystron-type with cavities of variable volumes coupled to the rhumbatrons.
Fig. 2 shows another embodiment as part of a construction similar to that shown in Fig. 1.

In Fig. 1 and Fig. 2 the rhumbatrons 1 and 2 are provided with connecting adjacent cavities 3 and 4 in which the movable metal pistons 5 and 6 with their rods 7 and 8 are located. The piston rods are provided with teeth which are arranged to engage the teeth of the gear-wheels 13 so that the piston rods with their respective pistons can be moved backwards. The gear wheels 13 are only partly provided with teeth for the control of the piston rods. When the teeth of the gear wheels loose their engagement with the teeth of the piston rods, the rods and the pistons are moved forwards by means of the spiral springs 9 and 10 pressing on the discs 11 attached to said rods until the pistons reach the dotted position marked in the figure.

The gear wheels 13 are located on a rotating shaft 14 with the rotor 15 inside an airtight cavity communicating with the cavities 3 and 4. The rotor is driven by means of a stator 16 located outside the cavity. Energy can be taken from the resonator cavity 1 by the concentric conductor 17.

In Fig. 2 the cavity resonator 1 is hermetically closed by means of the glass plug 19, through which the concentric conductor 18 enters the adjacent cavity 4. The glass plug 19 is located in a node corresponding to the wave-length of the cavity resonator.

Due to a certain factor of coupling between the cavity resonator 1 and the adjacent cavity 4 a variation of the resonating frequency of the resonator 1 is obtained by variation of the volume of the outside cavity 4.

By frequency modulation according to the present invention it is more convenient to vary the volume of a small cavity a greater percentage of its volume than to vary the volume of a larger cavity with the same volume-variation, because in such a way a great change of the basic frequency of the cavity is obtained.

Figures 3, 4:
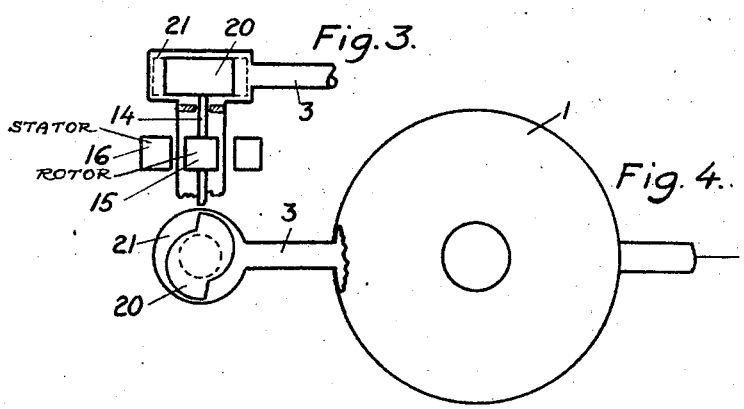
Fig. 3 and Fig. 4 show another device for the variation of the volume of a cavity.

In Fig. 3 and Fig. 4 the same numerals are used for similar parts. Instead of pistons cam-shaped discs 20 of metal or of other suitable material, for example hard rubber, are adapted to rotate in cavities 21, connected to the corresponding cavity resonators. Upon the rotation of the shaft 14 with the disc 20 the volume of the additional cavity 3—21 will vary according to a certain function.

Figure 5:
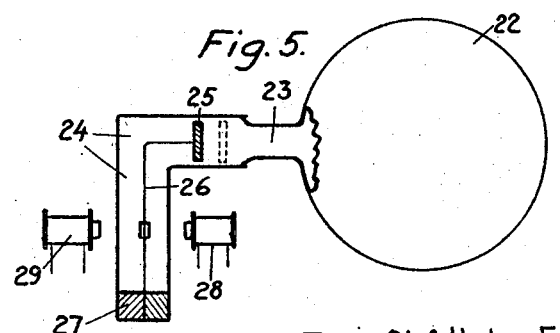
Fig. 5 shows still another device for the same purpose.

In Fig. 5 the cavity resonator 22 is connected to the cavity 23—24 and provided with a bent spring 26, one end of which is provided with a piston 25, and the other end being fastened to a bushing 27, attached to one end of the cavity 24. The spring 26 is adapted to be operated by an electromagnetic device, for example the electromagnets 28 and 29 outside the cavity 24, whereby the spring 26 and the piston 25 can be caused to vibrate. The volume of the cavity 23 is thereby increased and decreased and thus the basic frequency of the cavity resonator 22.

In Fig. 6 which shows a frequency modulated ultrashort wave radio transmitter with a stabilising device for the basic frequency of the transmitter, the cavity resonators 31 and 32 form parts of a Klystron device with additional cavities 33 and 34 respectively. In said cavities there are provided the pistons 35 and 36 movably attached to bent springs 37 and 38 so that the volumes of the auxiliary cavities can be varied when the pistons are moved to and fro. The springs 37 and 38 are normally arranged to vibrate by means of the electromagnets 39—40 and 41—42, which are fed with alternating current from the transformer 43 and cooperate to move springs 37 and 38, respectively, in one or the other direction.

According to the present invention a perfect stabilisation of an ultrashort wave transmitter is obtained by means of tuned cavity resonators of any type, for example of the rhumbatron-type as shown in Fig. 6, whereby one or two rhumbatrons 46—47 and 48—49 are arranged in bridge connection, whereby the dipole 51 is connected to the common concentric conductor 50, said dipole being located in the neighbourhood of the energy output 45 of the transmitter to be controlled.

The bridge connection on the other side is connected in series with the diodes 52 and 53 or with bolometer receivers to the respective grids 55 and 56 in the double amplifier 54.

The anodes 57 and 58 of the said double amplifier are connected to the corresponding windings 60—62 and 61—63 of polarized relays by means of which the springs 38 and 37 respectively are actuated.

The series-coupled resonators 46—47 on one side of the bridge are tuned to a frequency $(f_1-f_2)$, which with an amount of $f_2$ varies from the desired basic frequency $f_1$. The series-coupled resonators in the other side of the bridge are tuned to a frequency $f_1+f_2$.

The device operates in the following way. If the dipole 51 is placed near the emitted energy from the transmitter 31—32, supposed to operate at a basic frequency $f_1$, different amounts of wave energy pass through the parallel bridge-arms 46—47 and 48—49 to the diodes 52 and 53 respectively, but only if the basic frequency differs from $f_1$. In such a case more current passes through one diode than through the other, and after amplification in the tube 54, the windings 62 and 63 are more actuated than the counter-directed windings 60—61, whereby the springs 38 and 37 are pulled towards the relay cores 62 and 63 respectively. Hereby the cavities 34 and 33 are increased until the basic frequency again equals $f_1$.

According to the present invention the average basic frequency can thus be kept constant at the same time that frequency modulation takes place about the said average basic frequency.

We claim:

1. A device for modulating the resonant frequency of an ultra short wave generator, a cavity resonator associated with said generator and comprising an auxiliary chamber in communication with said cavity, a member displaceable in said auxiliary chamber to vary the active volume thereof, and means for rhythmically displacing said member in said chamber to increase and decrease said active volume and thus the basic mean frequency of the cavity resonator in step with the frequency modulation impressed upon the same, part of said auxiliary chamber being formed as a plunger casing and said displaceable member is a plunger reciprocable in said casing, said means for displacing said member including a spring in said chamber bent at right angles to form two legs, the end of one of said legs being mounted in a wall of said chamber and the end of the other leg supporting said plunger, and electromagnetic means outside said chamber for cooperation with said first mentioned leg of said bent spring.

2. A device for modulating and stabilizing the basic mean frequency of an ultrashort radio wave transmitter, a cavity resonator associated with said transmitter, said device comprising a chamber containing an active volume normally associated with said cavity resonator, means to vary the active volume of said chamber, biasing means including a source of alternating current and two counterconnected relay windings connected thereto for actuating said volume varying means, two separate sets of equal cavity resonators coupled in bridge connection, a common dipole at one end of the bridge to receive radio energy from the transmitter, and a double triode rectifying device having its grids connected to the other ends of said two separate cavity resonator sets, respectively, the two anodes of said double triode being coupled, respectively, to said two counterconnected relay windings of said biasing means, one of said separate sets of cavity resonators being tuned a little below and the other set being tuned a little above the basic mean frequency of the transmitter.

JOHAN OLOF HELGE FREDHOLM.
PER HARRY ELIAS CLAESSON.

REFERENCES CITED

The following references are of record in the file of this patent:

UNITED STATES PATENTS

| Number | Name | Date |
|---|---|---|
| 2,032,620 | Langmuir | Mar. 3, 1936 |
| 2,106,770 | Southworth et al. | Feb. 1, 1938 |
| 2,160,466 | Usselman | May 30, 1939 |
| 2,174,701 | Koch | Oct. 3, 1939 |
| 2,218,223 | Usselman et al. | Oct. 15, 1940 |
| 2,241,976 | Blewett et al. | May 13, 1941 |
| 2,243,216 | Lindenblad | May 27, 1941 |
| 2,262,932 | Guanella | Nov. 18, 1941 |
| 2,280,824 | Hansen et al. | Apr. 28, 1942 |
| 2,281,935 | Hansen et al. | Sept. 29, 1942 |
| 2,294,942 | Varian et al. | Sept. 8, 1942 |
| 2,296,919 | Goldstine | Sept. 29, 1942 |
| 2,296,962 | Tunick | Sept. 29, 1942 |
| 2,306,282 | Samuel | Dec. 22, 1942 |
| 2,311,658 | Hansen et al. | Feb. 23, 1943 |
| 2,312,919 | Litton | Mar. 2, 1943 |
| 2,337,214 | Tunick | Dec. 21, 1943 |
| 2,374,810 | Fremlin | May 1, 1945 |